Feb. 4, 1969  J. R. ANDERSEN ET AL  3,426,308
ROTATABLE CONNECTION
Filed Nov. 29, 1965  Sheet 1 of 3

INVENTORS
J. R. ANDERSEN
A. R. SMITH
A. H. WILLIAMSON, JR.

BY B. F. Stoddard

ATTORNEY

United States Patent Office 3,426,308
Patented Feb. 4, 1969

3,426,308
ROTATABLE CONNECTION
Johan R. Andersen, Bloomingdale, Arnold R. Smith, and Andrew H. Williamson, Jr., Chester, N.J., assignors to Bell Telephone Laboratories, Incorporated, New York, N.Y., a corporation of New York
Filed Nov. 29, 1965, Ser. No. 510,461
U.S. Cl. 339—5        8 Claims
Int. Cl. H01r 39/02

ABSTRACT OF THE DISCLOSURE

An electrical connection between two relatively rotatable coaxial members comprising a flat multi-conductor cable spirally wound about one member and connected inside the other. Spring biased rollers form a clutch which controls rotational movement of the supporting parts. A motor rotates the inner member. The device may be used in various equipment requiring electrical connection between rotating elements.

---

This invention relates to a rotatable connection and, more particularly, to a system of connection between a stationary member and a rotatable member. The invention is especially useful for completing connections between the electric conductors of a stationary cable and a rotating cable.

There are numerous types of equipment that require the connection of one or more electric conductors between two elements which are subject to relative rotational motion. In other words, there are certain forms of equipment in which it is necessary to have continuous electric connections between two members, at least one of which rotates with respect to the other. Equipment of this type includes rotatable turrets of warships, revolving cranes, machine tools, and rotatable antenna systems.

In the past, the electric connections for such equipment have utilized slip rings, electrically conductive brushes, sliding contacts, and various forms of coiled electric cable. However, these connections have not been fully satisfactory. For example, some of them introduce excessive contact noise into adjacent electric signalling circuits. Others are subject to high attenuation, corrosion, and electric discontinuities. In addition, the various types of coiled cable suffer from stress concentrations which, combined with frictional wear, result in breakage of the electric conductors. This, in turn, is liable to produce short circuits and overheating with the attendant hazard of igniting adjacent apparatus.

Accordingly, it is an object of this invention to provide an improved system of connection between a stationary member and a rotatable member.

Another object of this invention is to provide an improved flexible electric conductor in a rotatable electric connecting system.

An additional object of the invention is to provide an electric connecting system of improved durability between two members in relative motion.

Still another object of the invention is to provide means for minimizing and equalizing the torque requirements of a rotatable electric conductor in an electric connecting system.

A further object of the invention is to provide means for minimizing bunching and rubbing of the coils of a rotatable electric conductor.

These and other objects of the invention are attained by employing a flexible multiconductor flat cable spirally coiled with one end connected to a rotatable member located at the center of the coils and the other end connected to a stationary member positioned outside the coils. This cable is provided with an outer coating of improved material for the purpose of reducing friction during its movement. The system of connection further includes a rotatable disk mounted horizontally for encircling the rotatable member. Control means are provided which are responsive to the rotation of the rotatable member in one direction for causing the member and the disk to rotate together in this direction. The system further includes a stationary platform abutting against the stationary member and encompassing the disk. Additional control means are provided which are responsive to the rotation of the rotatable member in the opposite direction for preventing the rotation of the disk in this direction. Both the rotatable disk and the stationary platform are designed for supporting portions of the coiled cable in substantially the same plane.

These and other features of the invention are more fully discussed in connection with the following detailed description of the drawing, in which.

Figure 1:
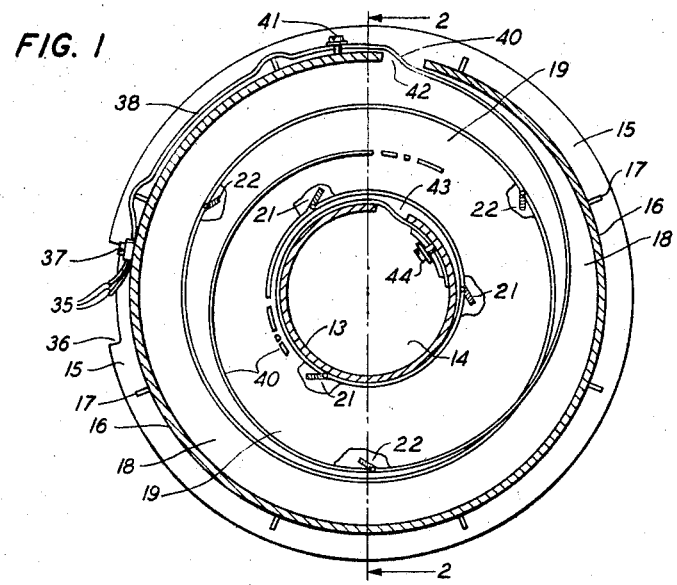
FIG. 1 is a top view of a system of rotatable electric connection in accordance with this invention.

The invention will now be described with reference to an exemplary application thereof, such as to a portion of a rotatable antenna system. Accordingly, in FIG. 1, a hollow central support column 13 of an antenna system is mounted upon a rotatable support base 14 which is adapted to be rotated in each direction by any appropriate means, such as by a suitable motor 12. The base 14 is centrally positioned within a metallic support ring 15 which is fixedly located. This ring 15 supports a circular wall 16 which is attached thereto by means of brackets 17. The ring 15 also supports an annular platform or shelf 18 which is fastened thereto, such as by bolts, so as to remain stationary. If desired, the ring 15 and the shelf 18 could be made in one integral piece. It is to be understood that the invention is equally applicable to an antenna system wherein the column 13 and the base 14 are stationary while the ring 15, the wall 16, and the shelf 18 are rotatable.

Figure 3A:
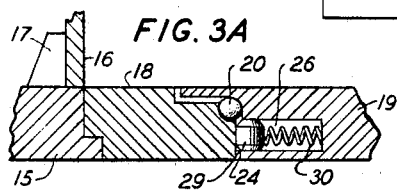
FIG. 3A is an enlarged view of the left portion of the connection system shown in FIG. 2.

The space between the inner edge of the stationary shelf of platform 18 and the outer surface of the rotatable central column 13 is occupied by a rotatable disk 19 having a central opening therein so as to permit it to encircle the column 13. This disk 19 is supported for rotation upon ball bearings 20 which are mounted in a groove in the shelf 18 as is represented in FIG. 3A. It is to be noted that the portion of the shelf 18 which supports the disk 19 is of reduced thickness so that the upper surface of the disk 19 and the top surface of the shelf 18 lie in approximately the same plane.

Figure 3B:
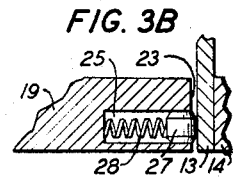
FIG. 3B is an enlarged view of another portion of the connection system shown in FIG. 2.
Figure 4:
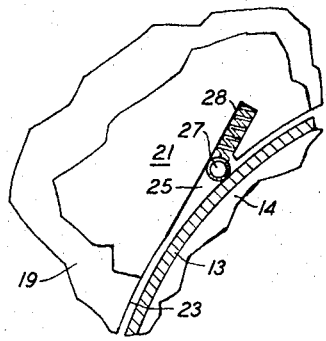
FIG. 4 is an enlarged view of a portion of FIG. 1 with a part thereof broken away for showing one of an inner group of clutches.

The disk 19 has two groups of clutches 21 and 22 positioned therein at spaced intervals along its inner and outer edges as is indicated in FIG. 1 in which portions of the disk 19 have been broken away to show the locations of the clutches 21 and 22. The clutches 21 in the inner group are formed by drilling holes 25 at an angle into the inner edge 23 of the disk 19 as is shown in FIGS. 3B and 4. The front portion of each of these holes 25 is adapted to receive therein a roller 27. The rear portion of each of the holes 25 functions as a socket for holding a spring 28 which tends to push its associated roller 27 outward so as to engage the surface of the rotatable column 13.

Figure 5:
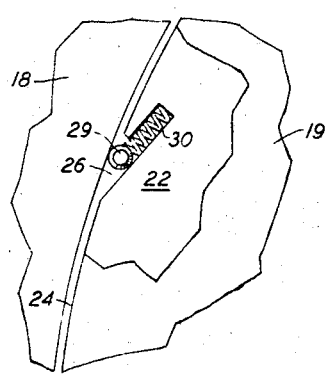
FIG. 5 is an enlarged view of a different portion of FIG. 1 with a part thereof broken away for showing one of an outer group of clutches.

Similarly, the clutches 22 in the outer group are formed by drilling holes 26 at an angle into the outer edge 24 of the disk 19 as is represented in FIGS. 3A and 5. Each of these holes 26 has a roller 29 positioned in its front portion. The rear portion of each of the holes 26 contains a spring 30 which tends to push its associated roller 29 outward into engagement with the edge of the stationary shelf 18. It should be noted that, since the holes 25 and 26 are drilled at an angle, the front part of each of the holes 25 and 26 has a wide portion and also has a narrow portion into which the associated rollers 27 and 29 become wedged under circumstances described hereinafter.

The clutches 21 and 22 function as means for binding the disk 19 alternatively to either the rotatable column 13 or to the stationary platform 18. The manner in which this is accomplished will now be described. Let it be assumed that the base 14 and the column 13 are driven so as to rotate in a counterclockwise direction in FIG. 1. As the springs 28 in the inner group of clutches 21 normally force their associated rollers 27 into contact with the rotating column 13, the resulting frictional engagement tends to cause each roller 27 to rotate in a clockwise direction. Since the disk 19 is stationary at the start of this motion, the rollers 27 are driven into the narrow portions of the front parts of their respectively associated holes 25 where they become wedged against the column 13 thus, in effect, binding the disk 19 to the column 13 for counterclockwise rotation therewith.

During this time, the springs 30 in the outer group of clutches 22 tend to push their associated rollers 29 against the edge of the stationary platform 18. Accordingly, when the disk 19 begins to rotate with the column 13, the resulting frictional engagement between the stationary platform 18 and the rollers 29, which are now being carried in a counterlockwise direction with the disk 19, functions to cause the rollers 29 to rotate in a clockwise direction. Since the rollers 29 are now moving with the disk 19, the force exerted by the associated springs 30 is overcome with the result that the rollers 29 now move toward the wider portions of the front parts of their respectively associated holes 26 so as not to impede the counterclockwise rotation of the disk 19.

Now, let it be assumed that the base 14 and the column 13 are driven so as to rotate in a clockwise direction. Under this condition, the frictional engagement between the rotating column 13 and the rollers 27 in the inner group of clutches 21 tends to cause the rollers 27 to rotate in a counterclockwise direction. These motions function to drive the rollers 27 against the force exerted by their associated springs 28. This results in the movement of the rollers 27 toward the wider portions of the front parts of their respectively associated holes 25 thereby removing the binding effect formerly exerted by the rollers 27 upon the disk 19.

Just before this binding effect is removed, the disk 19 will be briefly moved in a clockwise direction carrying with it the rollers 29 in the outer group of clutches 22. This motion produces a frictional engagement between the stationary platform 18 and the rollers 29 which is of such a nature as to cause the rollers 29 to rotate in a counterclockwise direction. Since the rollers 29 are now moving with the disk 19, the rollers 29 are driven into the narrow portions of the front parts of their respectively associated holes 25. Accordingly, the rollers 29 now become wedged against the stationary platform 18 thus, in effect, binding the disk 19 to the platform 18 with the result that the disk 19 is held stationary.

The electric connections for the antenna system in this exemplary embodiment of the invention comprise a plurality of electric conductors or cables 35 which are applied to the connection system through a notched portion 36 in the support ring 15 to which they are fixedly secured by means of an appropriate clamp 37. At this point, the cables 35 are bonded together, one above another, between a suitable flexible material 38 having a low coefficient of friction, such as Teflon sheets, so as to form a wide cable ribbon or band 40.

The resulting cable band 40 is so positioned that it has one edge supported by the ring 15 while one of its flat sides is placed against the circular wall 16 to which it is secured by an appropriate clamp 41. Just beyond the clamp 41, the cable 40 passes through a slot 42 in the wall 16 and enters upon the stationary platform 18 and the rotatable disk 19. Here, while it still positioned on one edge, it is spirally wound in a number of turns, such as six or eight, about the central column 13. As is shown in the drawing, these cable turns, or wraps, are loosely wound in a clockwise direction and rest upon both the stationary platform 18 and the rotatable disk 19.

When the cable band 40 approaches the hollow central column 13, it passes through a slot 43 therein and is fastened to the interior wall of the column 13 by means of a suitable clamp 44. At this point, the Teflon covering is discontinued and the cable band 40 is separated into its component electric conductors or cables 35 which now travel along the interior of the column 13 to other equipment.

Figure 9:
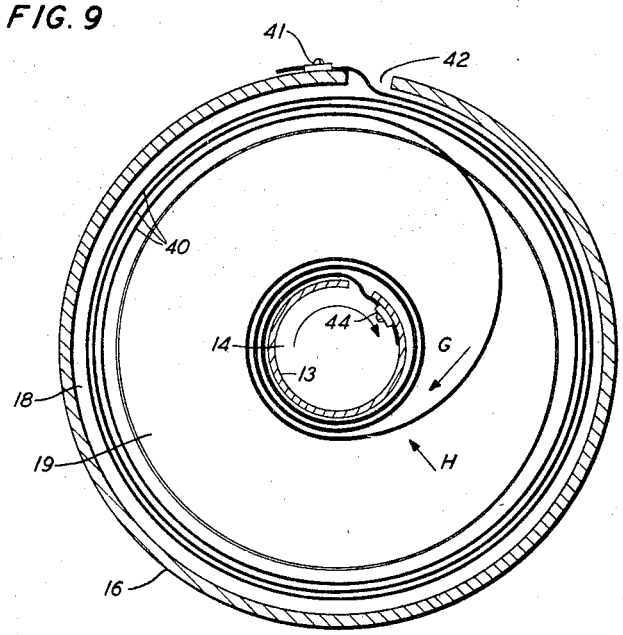

From the above description, it can be understood that, when the column 13 rotates in a clockwise direction, it winds the loose turns of the cable band 40 around it, as is represented in FIG. 9. Since the cable band 40 originally is loosely disposed around the column 13, as was stated above, this looseness permits the column 13 to make, in this embodiment of the invention, about two complete rotations in one direction before the slack cable 40 is completely wound around it.

Figure 7:
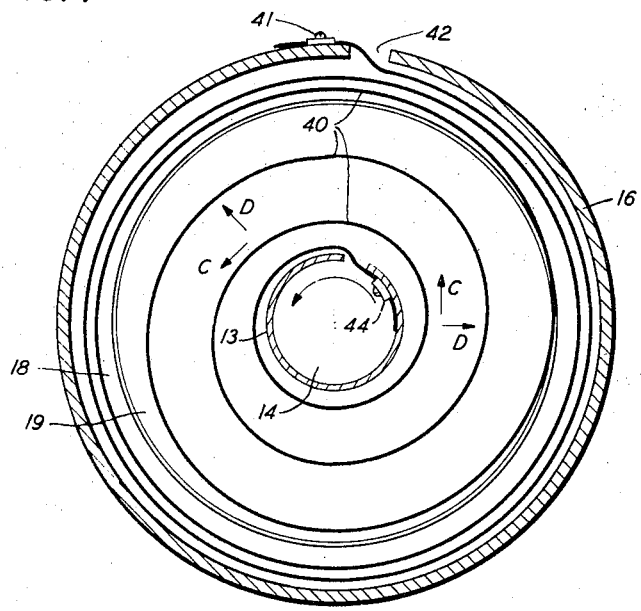
FIGS. 7 and 9 are top views showing the preferred effects produced upon the coiled conductor during the operation of the connection system of this invention.

When the column 13 is rotated in the opposite direction, the turns of the cable 40 are unreeled from it and are moved outward toward the wall 16 as is indicated in FIG. 7.

Thus, by means of this interchange of the spiral cable turns from outer positions near the wall 16 to inner positions near the column 13 and vice versa, continuous electric connections from the stationary ring 15 to the rotatable column 13 can be maintained during their relative rotational motion. In other words, electric connections between the stationary member 15 and the rotatable member 13 can be established by forming the electric cables 35 into an elongated flexible connecting member 40 having one end remaining stationary while the other end follows the movement of the rotating member 13.

It can be understood that, in an active system wherein the column 13 rotates back and forth frequently, the spiral turns of the cable band 40 are subjected to much motion. For this reason, it is necessary to employ the combination of the stationary platform 18 and the rotatable disk 19 in order to minimize bunching, buckling, and rubbing of the coils of the cable band 40. Such minimization is desirale because excessive bunching, buckling, bending, and rubbing of the cable coils can result in breakage of the electric conductors and thereby produce short circuits which would be liable to ignite adjacent apparatus.

Figure 2:
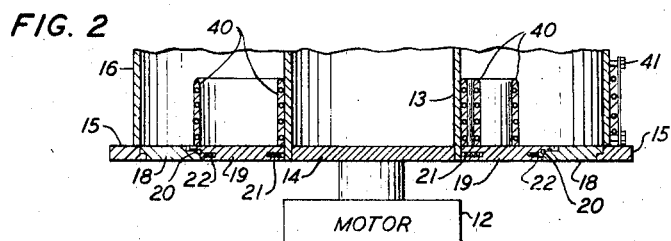
FIG. 2 is a side sectional view of the same system taken along the line 2—2 in FIG. 1.
Figure 6:
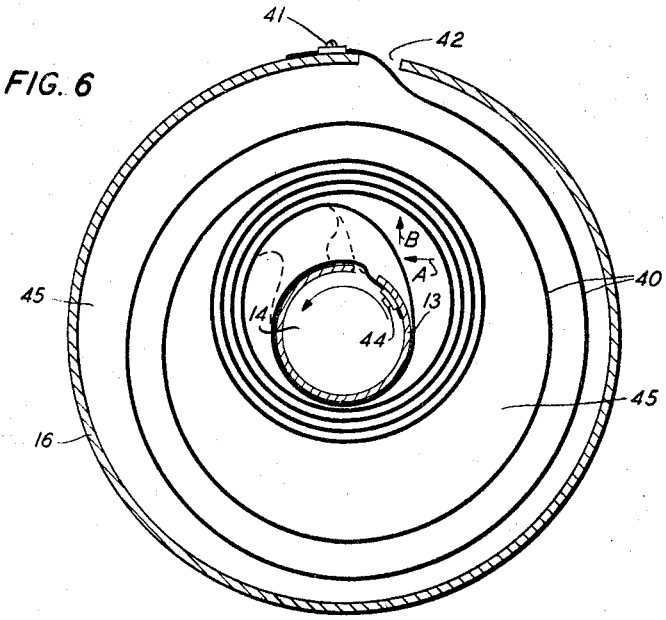
FIGS. 6 and 8 are top views showing undesired bunching and buckling of the turns of coiled conductors in other types of connection systems.

The need for this invention can be better understood by analyzing the forces which act upon the cable band 40 with particular reference to FIG. 6. In FIG. 6, certain elements are the same as those shown in FIGS. 1 and 2; namely, the stationary wall 16 and the rotatable column 13 mounted on the rotatable base 14. The support ring 15 has been omitted for the purpose of simplicity.

However, let it be assumed that the turns of the spirally coiled cable band 40 are not supported by the platform 18 and the rotatable disk 19 but, instead, are supported by a stationary floor 45 which occupies the space between the wall 16 and the column 13. Let it also be assumed that the cable band 40 has been previously wound in a clockwise direction around the central column 13.

Now, when the column 13 begins to move in a counterclockwise direction, it will unwind the cable band 40. At the start of this motion, the column 13 will transmit a compressive force through the cable band 40 so as to move it outward thereby increasing the radii of its coils. Due to the spiral configuration of the coils of the cable band 40, the initial compressive force transmitted through the cable band 40 has both a tangential component, indicated by the force vector A, and an outward radial component, represented by the force vector B. When this compressive force reaches the stationary end of the cable band 40 near the clamp 41 adjacent to the wall 16, the tangential component is opposed by an equal force so that, at this point, only the radial component acts on the cable band 40 thereby tending to push it toward the wall 16.

As the column 13 continues to rotate in a counterclockwise direction, more of the cable band 40 will be forced to move toward the wall 16. Accordingly, the major portion of the cable band 40 would finally be moved toward the wall 16 if there were no friction between the bottom edge of the cable band 40 and the stationary floor 45. Although the Teflon covering 38 has a minimizing effect, such friction does exist and produces a result that will now be described.

At the beginning of the unwinding process, the tangential component A of the compressive force has sufficient magnitude to overcome the effect of the friction between the stationary floor 45 and one or two of the innermost coils of the cable band 40 so that these cable coils are moved outward. As the unwinding process continues and more of the cable coils are moved outward thereby increasing their radii, the tangential friction between the floor and the cable coils will increase to such an extent that it will equal and then exceed the tangential component A of the compressive force transmitted by the column 13. When this occurs, the outward radial component B of the compressive force will tend to push the cable coils off center.

This further increases the radii of the cable coils to such an extent that the inner section of the cable band 40, which lies near the rotating column 13, moves from a circular path toward a straight position. In other words, it tends to assume the position of a radius extending outward from the column 13. This cable section becomes subjected to the excessive bending movement of the friction produced by the stationary floor 45 multiplied by the moment arm of this radial cable section.

As a result, the cable band 40 is forced to bend or buckle increasingly, as is indicated by the progressive stages shown in broken lines in FIG. 6, thereby causing the tangential component A of the compressive force to become negative. If this buckling of the cable band 40 should be allowed to continue, it would become doubled thus producing excessive bending of the cable band 40 which might result in breakage of its electric conductors and thereby cause short circuits.

These undesirable effects are avoided by using the stationary platform 18 and the rotatable disk 19 of this invention. This can be understood by referring to FIG. 7 which shows shows the platform 18 and the disk 19 supporting a cable band 40 that is being unwound from the central column 13 by its counterclockwise rotation. As was explained above, the counterclockwise rotation of the column 13 causes the inner group of clutches 21 to bind the disk 19 to the column 13 for rotation therewith. With the disk 19 being thus positively driven, there will now be relatively no friction between the surface of the disk 19 and the unwinding cable band 40. This serves to increase both the tangential component C and the radial component D of the compressive force produced by the rotating column 13.

Since the magnitude of this radial component D is largest at a point near the stationary end of the cable band 40 adjacent to the wall 16, it will function to push the cable band 40 on to the annular platform 18 and to pack the cable coils against the circular wall 16 as is represented in FIG. 7. The advantage of this method is clearly apparent from inspection of FIG. 7 which shows that there is no bunching nor buckling of the cable coils. Instead, the unwinding cable band 40 is thrown clear of the disk 19 which flings it on to the stationary platform 18 where it is stored against the wall 16.

Figure 8:
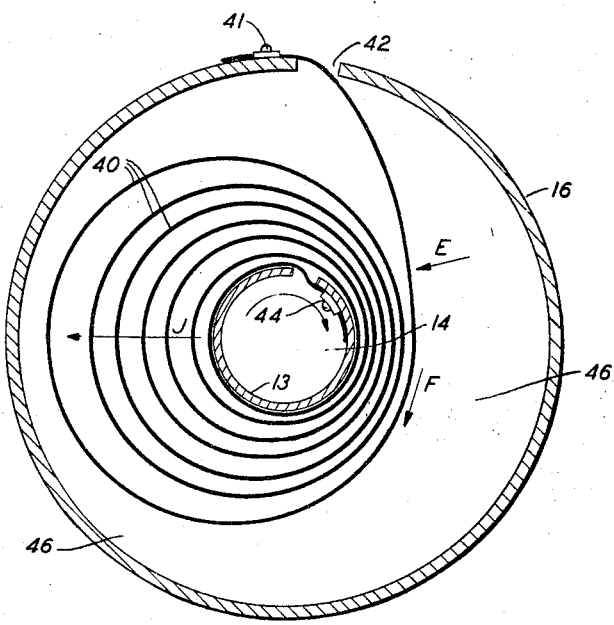

In considering the effects produced when the column 13 is rotated in a clockwise direction for winding the cable band 40 around it, let it be assumed that the space between the wall 16 and the column 13 is occupied by a floor 46, indicated in FIG. 8, which is rotating with the column 13 is a clockwise direction. Let it also be assumed that the cable band 40 has been previously stored against the wall 16.

Now, when the cable coils start to unwind and move from the wall 16 toward the column 13, the friction between the rotating floor 46 and the cable coils creates an outward radial force J. This force ultimately functions to bunch the cable coils together along one side of the column 13, as is represented in FIG. 8, thereby increasing the friction between the individual turns of the cable coils. Thus, instead of there being a gradual unwinding of the inner turns of the cable band 40, there is an off-center arrangement. This produces excessive tension F in the outermost half turn of the cable band 40 thereby creating an unbalanced radial force component E.

This radial force component E causes the outermost half turn of the cable band 40 to pivot near the clamp 41. This causes the cable coils to be pushed off-center, as is shown in FIG. 8, thereby increasing the friction between the rotating floor 46 and the turns of the cable band 40 with the result that the cable turns become increasingly bunched around the column 13. Accordingly, during the continuation of the winding process, the force required to wind the cable band 40 will vary inversely with the radial distance from the column 13 to the bunched, off-center cable turns. In turn, this increases the torque requirements of the column 13 and produces excessive wear of the cable band 40.

These undesirable effects are avoided by employing the stationary platform 18 and the outer group of clutches 22 for holding the disk 19 stationary during the time that the column 13 is being rotated in a clockwise direction for winding the cable band 40 as is shown in FIG. 9. Under these circumstances, the magnitudes of the tangential force component G and the inward radial force component H are greatest at points near the surface of the column 13. Thus, the force components G and H function to force the cable turns smoothly and evenly around the column 13 without increasing the torque requirements of the column 13. The effect of friction between the stationary disk 19 and the cable band 40 serves to increase the tension in the cable band 40 in a smooth manner. It should be noted that, during this winding process, there are no compressive forces which would tend to produce buckling of the cable band 40.

Therefore, from the above analysis, it can be understood that this invention provides an improved rotatable electric connection which employs an improved flexible electric conductor with means for increasing its durability by minimizing bunching, buckling, bending, and rubbing of its coils. Since this electric conductor is spirally coiled and has its coils alternatively wound and unwound, the improved means of this invention are designed to minimize and equalize the torque requirements of the instrumentalities that drive the coiled conductor.

What is claimed is:

1. A system of connection between two members at least one of which is rotatable in different directions with respect to the other,
    said members being so disposed that one encompasses the other,
    said system comprising a connector positioned between said members with one portion connected to one member and another portion connected to the other member,
    said connector being spirally disposed around the inner one of said members whereby said connector becomes alternatively wound and unwound in response to rotation in different directions of the rotatable one of said members,
    and instrumentalities for preventing bunching and buckling of the spiral turns of said connector during its winding and unwinding movements,
    said instrumentalities including a movable supporting device located between said members for supporting said connector,
    first means responsive to rotation in one direction of the rotatable one of said members for effecting the rotation of said supporting device in the same direction,
    and second means responsive to rotation in the opposite direction of the rotatable one of said members for effecting the holding of said supporting device stationary.

2. A system in accordance with claim 1 wherein said supporting device has a first edge near the rotatable one of said members and a second edge near the other one of said members,
    said first means including first clutch means positioned on said supporting device at or near said first edge thereof for engagement with the rotatable one of said members,
    and said second means including second clutch means positioned on said supporting device at or near said second edge thereof for engagement with the other one of said members.

3. A system in accordance with claim 2 wherein said supporting device is rotatably mounted on the encompassing one of said members.

4. A system of connection between an outer member and an inner member surrounded by said outer member,
    one of said members being stationary and the other being rotatable with respect to the first member,
    means for rotating said rotatable member in one direction and alternatively in the opposite direction,
    said system comprising an elongated flexible connecting member positioned within said outer member with one end connected thereto and spirally wound around said inner member with one end attached thereto whereby said connecting member becomes wound and unwound in response to the rotation of said rotatable member,
    a supporting member located between said outer and inner members for supporting said spirally disposed connecting member,
    means responsive to rotation of said rotatable member in one direction for effecting similar rotation of said supporting member in the same direction,
    and means responsive to rotation of said rotatable member in the opposite direction for holding said supporting member stationary.

5. A system of connection between two members at least one of which is rotatable in different directions with respect to the other,
    said members being so disposed that one encompasses the other,
    said system comprising a connector positioned between said members with one portion connected to one member and another portion connected to the other member,
    said connector being spirally disposed around the inner one of said members whereby said connector becomes alternatively wound and unwound in response to rotation in different directions of the rotatable one of said members,
    and instrumentalities for preventing bunching and buckling of the spiral turns of said connector during its winding and unwinding movements,
    said instrumentalities comprising supporting means located between said members for supporting said spirally disposed connector,
    said supporting means including a shelf attached to the encompassing one of said members,
    a movable supporting device located between said shelf and the encompassed one of said members,
    said movable supporting device being so mounted that one of its surfaces lies in a common plane with a surface of said shelf,
    said connector being so disposed that some of its spiral turns are supported on one of said surfaces and other of its spiral turns are supported on the other of said surfaces,
    first means responsive to rotation in one direction of the rotatable one of said members for effecting the rotation of said supporting device in the same direction,
    and second means responsive to rotation in the opposite direction of the rotatable one of said members for effecting the holding of said supporting device stationary.

6. A system of connection between a stationary member and a rotatable member,
    said system comprising a rotatable disk encircling said rotatable member,
    means responsive to rotation of said rotatable member in one direction for binding said disk to said rotatable member for rotation therewith in said one direction,
    a stationary platform encompassing said disk and abutting against said stationary member,
    means responsive to the start of rotation of said disk in another direction for binding said disk to said stationary platform for holding said disk stationary therewith,
    and an elongated flexible connecting member disposed spirally on both said disk and said platform with one end secured to said rotatable member and another end attached to said stationary member.

7. A system of connection between a stationary member and a rotatable member,
    said system comprising a rotatable disk encircling said rotatable member,
    means responsive to rotation of said rotatable member in one direction for binding said disk to said rotatable member for rotation therewith in said one direction,
    a stationary platform encompassing said disk and abutting against said stationary member,
    means responsive to the start of rotation of said disk in another direction for binding said disk to said stationary member for holding said disk stationary therewith,
    and an elongated flexible connecting member spirally disposed around said rotatable member with one portion secured to said stationary member and another portion attached to said rotatable member whereby said connector becomes alternatively wound and unwound in response to rotation in different directions of said rotatable member,
    said disk being so mounted that one of its surfaces lies in a common plane with a surface of said platform,
    and said connecting member having some of its spiral turns supported on said surface of said platform and other of its spiral turns supported on said surface of said disk.

8. A system of connection between a stationary member and a rotatable member, said system comprising an elongated flexible connector having one portion attached to said rotatable member and another portion secured to said stationary member, said connector being spirally disposed around said rotatable member whereby said connector becomes alternatively wound and unwound in response to rotation in different directions of said rotatable member, a rotatable disk encircling said rotatable member and having a surface for supporting a portion of the spiral turns of said connector, first clutch means positioned on said disk and adapted to engage said rotatable member for binding said disk thereto in response to rotation of said rotatable member in one direction, a stationary annular shelf encompassing said disk and attached to said stationary member, said shelf having a surface for supporting another portion of the spiral turns of said connector, said surface of said shelf and said surface of said disk being in the same plane, and second clutch means positioned on said disk and adapted to engage said stationary shelf for binding said disk thereto in response to rotation of said rotatable member in the opposite direction.

References Cited

UNITED STATES PATENTS 2,955,271   10/1960   Dawkins _____ 339—2

FOREIGN PATENTS

| 2,220,001 | 11/1957 | Australia. |
| 856,982 | 4/1940 | France. |
| 972,006 | 8/1950 | France. |
| 751,684 | 2/1953 | Germany. |
| 518,098 | 2/1940 | Great Britain. |

RICHARD E. MOORE, *Primary Examiner.*